United States Patent Office 2,956,032
Patented Oct. 11, 1960

2,956,032

FIRE RESISTANT ORGANOSILOXANE ELASTOMER FOAMS AND METHOD OF PREPARING SAME

Ronald L. Joyce, Midland, Mich., assignor to Dow Corning Corporation, Midland, Mich., a corporation of Michigan No Drawing. Filed June 2, 1958, Ser. No. 738,948

8 Claims. (Cl. 260—2.5)

This application relates to organosiloxane elastomer foams of reduced flammability.

Organosiloxane elastomer foams are disclosed and claimed in United States application Serial No. 708,369, filed January 13, 1958, now abandoned, and assigned to Dow Corning Corporation. These foams are prepared by mixing (1) 100 parts by weight of a hydroxylated organopolysiloxane having a viscosity of at least 50 cs. at 25° C. and having an average of 1.9 to 2.0 monovalent hydrocarbon radicals, halogenated monovalent hydrocarbon radicals or hydrogen atoms per silicon atom, there being at least one hydrogen bonded to silicon in from 1 to 75% by weight of the siloxane units present and the the ratio of organic substituents to silicon atoms being at least 1.25/1, (2) 0 to 50 parts of a hydroxylated compound and (3) .1 to 10% by weight of tin added as a stannous salt of a carboxylic acid. The mixed ingredients are allowed to stand at room temperature and a cured elastic foam is obtained.

The elastic foams prepared as above are thermally stable, suitable for thermal insulation, for cushioning against mechanical shock and for damping. However, because of the cellular form of the foam, a large surface area is presented and the cured silicone rubber foam is flammable. It is quite apparent that a flammable foam is undesirable for many applications. Therefore, applicant sought additives which would act as fire retardants for such foams.

The primary object of this invention is to produce fire resistant silicone rubber foam at room temperature. Another object is to find additives for known room-temperature curing silicone rubber foam systems to render the ultimate product fire retardant. Further objects and advantages of this invention are apparent or are specifically disclosed in the specification and claims which follow.

Applicant has found that the addition of 5 parts or more by weight of nickelous bromide, aromatic pentabromoethyl benzene or aromatic pentabromo toluene to 100 parts by weight of the foam forming composition outlined above, imparts fire retardant properties to the foam.

In the foams employed herein the siloxane (1) can be either a copolymer in which the SiH and SiOH appear in the same molecules or it can be a mixture of a hydroxylated siloxane (a) and a SiH-containing siloxane (b). Regardless of whether (1) is a copolymer of hydroxylated siloxanes and SiH-containing siloxanes or a mixture of these two types of materials, the overall composition of (1) must be within the above-defined range.

If the amount of siloxane units having SiH linkages is less than 1% by weight of (1), insufficient foaming is obtained. If the amount of SiH is above 75% by weight, inferior elastomers are obtained. Preferably the amount of SiH-containing siloxane is from 2 to 75% by weight of the total weight of siloxane (1).

When siloxane (1) is a mixture of components (a) and (b), the hydroxylated portion (a) contains on the average from 1.9 to 2 monovalent hydrocarbon or halogenated monovalent hydrocarbon groups per silicon atom and has a minimum viscosity of 50 cs. There is no critical upper limit to the viscosity of (a), so that it can range in viscosity from relatively thin fluids to non-flowing gums. (a) can be either homopolymeric or copolymeric.

Siloxane component (b) must be present in the mixture in amount so that the total weight percent of siloxane units having at least one H bonded to the silicon is from 1 to 75% by weight of the total weight of mixture (1). The viscosity of (b) is not critical and may range from materials of 1 to 2 cs. up to non-flowing gums. When (b) is a gum it is desirable to employ a solvent such as benzene, ether or the like in order to insure thorough mixing.

Siloxane (b) can be a completely condensed material such as cyclic siloxanes or triorganosilyl end-blocked siloxanes or it may also contain SiOH groups. (b) can be homopolymeric or copolymeric, and those valences of the silicon which are not satisfied by H and O atoms are satisfied by monovalent hydrocarbon or halogenated monovalent hydrocarbon radicals. Preferably there is on the average of at least 1 monovalent hydrocarbon or halogenated monovalent hydrocarbon radical per silicon atom.

Specific examples of copolymeric siloxanes which can be employed as siloxane (1) are 10 mol percent ethyhydrogensiloxane and 90 mol percent ethylmethylsiloxane; 25 mol percent HSiO$_{3/2}$, 25 mol percent dimethylsiloxane and 50 mol percent phenylmethylsiloxane; and 1 mol percent monophenylsiloxane, 5 mol percent H$_2$SiO, 4 mol percent octadecylmethylsiloxane and 90 mol percent dimethylsiloxane. All of these copolymers contain SiOH groups.

Specific examples of mixtures which can be employed as siloxane (1) are mixtures of a hydroxylated dimethylsiloxane and (CH$_3$HSiO)$_5$, mixtures of a hydroxylated copolymer of dimethylsiloxane and diphenylsiloxane and a copolymer of methylhydrogensiloxane and trimethylsiloxane and mixtures of a hydroxylated copolymer of monomethylsiloxane and dimethylsiloxane and a copolymer of methylhydrogensiloxane and dimethylhydrogensiloxane.

Siloxane (1), both mixtures and copolymers, can contain any of the following types of siloxane units, RSiO$_{3/2}$, R$_2$SiO, R$_3$SiO$_{1/2}$, RHSiO, HSiO$_{3/2}$, RH$_2$SiO, H$_2$SiO and SiO$_2$. These various units must be in the proportions such that the ratio of organic radicals and hydrogen atoms to silicon will fall within the above defined limits.

For the purpose of this invention the R groups on the silicon can be any monovalent hydrocarbon radical such as alkyl radicals such as methyl, ethyl, propyl or octadecyl; alkenyl radicals such as vinyl, allyl and hexenyl; cycloaliphatic radicals such as cyclohexyl, cyclopentyl and cyclohexenyl; aralkyl hydrocarbon radicals such as benzyl and aryl hydrocarbon radicals such as phenyl, tolyl, naphthyl and xenyl. The R groups can also be any halogenated monovalent hydrocarbon radical such as chlorophenyl, trifluorovinyl, chlorodifluorovinyl, trifluoropropyl, tetrafluoroethyl, bromoxenyl, α,α,α-trifluorotolyl, tetrafluorocyclobutyl, chlorotrifluorocyclobutyl and heptafluoropentyl.

From the above description it can be seen that the hydroxyl groups and the silicon-bonded hydrogen can be located in any portion of the siloxane molecule. Thus, for example, the hydroxyl groups can be on the end of the siloxane chains or they can be along the chains or they can be located in both positions. The same is true of the silicon-bonded hydrogen atoms.

In the preferred embodiment of this invention the composition also contains a hydroxylated compound (2) in addition to hydroxylated siloxane (1). Preferably hydroxylated compound (2) is present in amount from 1 to 50% by weight based on the weight of siloxane (1).

The function of this hydroxylated compound is to furnish excess hydroxyl groups for reaction with the silane hydrogen in order to produce sufficient gas to foam the composition. If desired, a mixture of two or more hydroxylated compounds (2) can be employed.

For purpose of this invention any hydroxylated compound either organic or inorganic which is at least partially compatible with the siloxane system is operative. Thus hydroxylated compound (2) can be, for example, hydroxylated organosilicon compounds such as silanols, e.g. trimethylsilanol, triphenylsilanol, triethylsilanol and dimethylsilanediol and low molecular weight hydroxylated siloxanes such as sym-tetramethyldisiloxanediol; water; carboxylic acids such as formic, acetic, isobutyric, malonic, caproic, succinic, benzoic, β-chloroacrylic, acetoacetic, chloroacetic, acetonedicarboxylic, mercaptoacetic, bromomalonic, α-cyanopropionic, succinamic and α-hydroxy-o-toluic acids and β-alanine; and alcohols of less than twelve carbon atoms. These alcohols can be monohydric monofunctional alcohols such as ethanol, isopropanol, butanol, tertiary-butanol and cyclopentanol; monohydric polyfunctional alcohols such as 2,2'-thiodiethanol, 2-aminoethanol, acetol, acetoin, 2,2,2-trichloro-1-ethoxyethanol, furfuryl alcohol, glycol monoacetate, α-hydroxyisobutyronitrile, lactic acid, cyanic acid, 4-hydroxy-4-methyl-2-pentanone, 2-propyn-1-ol, isothionic acid, aodol, gamma-chloroallyl alcohol, 2-nitro-1-butanol, 2-fluoroethanol, glycidol and hydracrylonitrile; polyhydric alcohols containing no other function such as ethylene glycol, propylene glycol, 1,6-hexanediol, glycerine, pentaerythritol and glucose and polyhydric polyfunctional alcohols such as triethanolamine, diethylene glycol, pentaethylene glycol, 3-butene-1,2-diol, bromalhydrate, 1-thioglycerol, glycerol β-mononitrate, glycerol ether, allanturic acid, arabonic acid and 2-ethyl-2-nitro-1,3-propanediol.

It should be understood that the use of hydroxylated compound (2) is optional since foams can be obtained by merely employing a mixture of siloxane (1) and the catalyst. This is particularly true where siloxane (1) contains a relatively low viscosity hydroxylated fluid. However, it is preferred to employ at least 1% of hydroxylated compound (2) since this gives superior foams. Mutual solvents such as dioxane, ethers, benzene or the like may be used to disperse (2) in (1).

The catalysts which are essential in the method of this invention are stannous salts of carboxylic acids. These should be employed in amounts such that there is from .1 to 10% by weight tin based on the weight of siloxane (1). For the purpose of this invention the stannous salt of any carboxylic acid is operative. This includes, for example, stannous salts such as stannous acetate, stannous oleate, stannous stearate, stannous linoleate, stannous naphthenates, stannous benzoate, stannous naphthoate, stannous succinate, stannous sebacate, stannous lactate, stannous maleate, stannous crotonate, stannous salicylate, stannous phthalate, stannous mandelate, stannous cinnamate and the stannous salt of phenyl acetic acid.

The fire retardant additives employed are nickelous bromide, aromatic pentabromo ethyl benzene and aromatic pentabromo toluene. These materials and methods of making them are known. They are added in amounts of at least 5 parts by weight per 100 parts of (1), (2) and (3). The upper limit on the amount of fire retardant additive employed is a practical rather than an operational limit. Thus, whereas 30 or even 50 parts of additive can be used, little is gained by using more than 25 parts per 100 parts of foam composition.

In carrying out the process of this invention the various ingredients can be mixed in any desired fashion. Thus, for example, one may mix all the ingredients simultaneously or one may mix a hydroxylated siloxane and a hydrogen containing siloxane to make up ingredient (1) and then dissolve the catalysts in hydroxylated compound (2) and thereafter mix the two mixtures and add the fire retardant additive. In fact, it is often desirable to mix the catalyst and hydroxylated compound (2) particularly in those cases where the catalyst is not particularly soluble in siloxane (1). Thus an alcohol soluble salt can be incorporated in the mixture quite readily by first dissolving it in an alcohol which serves as hydroxylated compound (2).

After the catalyst and siloxane (1) have been brought together foaming of the compositions of this invention begins in a very short time and is generally complete within 5 to 20 minutes. At the end of this time the siloxane elastomer has gelled so that a permanent elastomeric foam is obtained.

The density of the foams prepared by the method of this invention can vary from .5 pound per cubic foot upwards. In general the less dense foams are obtained under conditions which give the more rapid evolution of hydrogen coupled with conditions where gelation of the elastomer does not take place until a considerable degree of expansion has been obtained. Thus for the less dense foams it is desirable to use larger amounts of the SiH compound and/or larger amounts of the hydroxylated compound (2) than one would employ for the more dense foams. Also foams of lighter density can be obtained by gentle warming of the mixture during foaming. In fact it is often desirable but not essential that the mixtures be warmed during foaming particularly where extremely light and soft sponges are desired.

If desired, fillers can be incorporated in the elastomeric foams of this invention. Any desired filler can be employed although the preferred fillers are inorganic materials such as metal oxides such as titania, zinc oxide, ferric oxide and magnesium oxide; siliceous materials such as clay, diatomaceous earth, fume silicas, silica aerogels, and silica xerogels; ceramic materials such as powdered glass; asbestos; powdered metals such as powdered aluminum and silicon and carbon black. The fillers can be employed in any desired amount.

If desired, the compositions of this invention can contain other additives normally employed in silicone rubbers such as oxidation inhibitors, compression set additives, pigments and the like.

The compositions of this invention are particularly useful in thermal insulation where extremes of temperature are to be encountered. For example, they can be applied to incompletely fabricated articles which must subsequently be heated during the fabrication process. Thus, for example, the composition could be sprayed on the inside of an automobile body prior to application of the external enameled finish. The body can be subsequently enameled and then put through the enamel baking process without deteriorating the insulating foam on the inside of the body.

The following examples are illustrative only and should not be construed as limiting the invention which is properly delineated in the appended claims.

*Example 1*

100 parts by weight of a hydroxylated dimethyl polysiloxane fluid having a viscosity of about 4750 cs. at 25° C., 8 parts of a linear siloxane of the formula $(CH_3)_3SiO[(CH_3)_2SiO]_xSi(CH_3)_3$ having a viscosity of 20 cs. at 25° C., 5 parts $(C_6H_5)_2CH_3SiOH$ and 25 parts of diatomaceous earth were admixed and 10 parts by weight of anhydrous nickelous bromide was added and dispersed in the mixture. 5 parts by weight of stannous octoate was added to the mixture and a panel of foam 0.5 inch thick was formed. The panel was vulcanized and cured at room temperature. After five days, the panel was split and one section was further cured at 250° C. for 24 hours. Specimens were cut from the panels.

The above procedure was repeated employing 10 parts by weight of pentabromo ethyl benzene and again with 10 parts by weight pentabromo toluene in place of the nickelous bromide. A control was also prepared without any fire retardant additive. The last samples measured .5 by .5 by 5 inches. Each sample had a natural foam skin on two opposite faces, open cells on the other two faces and on the end surfaces. Each sample was marked with lines spaced 1 inch from each end. Thus, from either end there was one line 1 inch from the end and another line 4 inches from the end. One end of each sample was placed in a clamp on a ring stand. The longitudinal axis of the sample was horizontal and the transverse axis was at 45° to the horizontal. A wire gauze was clamped in a horizontal position .5 inch below the sample with about .5 inch of the sample extending beyond the edge of the gauze. A standard ⅜ inch Bunsen burner was adjusted with air ports open to produce a blue flame about 1 inch high. The tip of the flame was brought into contact with the end of the sample while the Bunsen burner was inclined at 45° from the horizontal. The flame was held in contact with the end of the sample for 5 seconds and was then removed. Time was measured with a stop watch starting when the flame made initial contact with the foam. The distance in inches the flame progressed along the lower edge of the test specimen after reaching the 1 inch mark was recorded as the flame propagation. The time for such propagation was also measured. A sample was considered totally burned if the flame progressed to the mark four inches from the free end. A sample which was self-extinguishing was subjected to a second ignition. The extent of propagation, time of propagation, time for self-extinguishing or time for total burning were recorded and are tabulated below.

This entire testing method is an adaptation of A.S.T.M. test method for flammability of rigid plastics over .050 inch in thickness (D635–56T, 1956 Supplement, Book of ASTM Standards, part 6, page 40).

|  | Room Temperature Cure | | | | | | Cure at 250° C./24 hours | | | | | |
|---|---|---|---|---|---|---|---|---|---|---|---|---|
|  | First Ignition | | | Second Ignition | | | First Ignition | | | Second Ignition | | |
|  | A | B | C | A′ | B′ | C′ | D | E | F | D′ | E′ | F′ |
| Control | Totally burned. | .33 | 2.75 |  |  |  | Totally burned. | 1.17 | 3.67 |  |  |  |
| Nickelous Bromide | 0 |  | .42 | 0 |  | 0.17 | 0 |  | 0.33 | 0 |  | .08 |
| Aromatic Pentabromo Ethyl Benzene | 0 | 0 |  | 0 | .08 |  | 0.5 | 1.0 |  | 0 | 0.67 |  |
| Aromatic Pentabromo Toluene | 0 | 0.08 |  | 0 | .08 |  | 0.5 | 1.17 |  |  |  |  |

A, A′, D, D′—Propagation in inches.
B, B′, E, E′—Propagation time in minutes.
C, C′, F, F′—Time in minutes for extinguishing or for total burning.

*Example 2*

Equivalent results were obtained from the method and procedure of Example 1 employing 4 parts by weight N-propyl orthosilicate, 100 parts by weight hydroxylated dimethylsiloxane polymer, 10 parts by weight hydroxyl end-blocked dimethylsiloxane polymer, 10 parts methyldiphenylsilanol, 10 parts by weight trimethylsilyl end-blocked methylhydrogensiloxane, 25 parts diatomaceous earth and 7 parts of nickelous bromide, pentabromo-ethylbenzene or pentabromo toluene.

The use of a wide variety of formulations for the foams is contemplated. The addition of the fire-retardants of this invention to any of the foams specifically disclosed in the U.S. patent application Serial No. 708,369, filed January 13, 1958, now abandoned, will produce a fire resistant foamed silicon rubber. Other variations in the foam are obvious to those skilled in the art and are included herein.

That which is claimed is:

1. A method of preparing a fire resistant siloxane elastomeric foam which comprises mixing (1) an organopolysiloxane containing silicon-bonded OH groups and having a viscosity of at least 50 cs. at 25° C. and having per silicon atom on the average from 1.9 to 2 radicals of the group consisting of monovalent hydrocarbon radicals, halogenated monovalent hydrocarbon radicals and hydrogen atoms, in said siloxane there being from 1 to 75% by weight siloxane units containing at least one silicon-bonded hydrogen atom and said siloxane containing an average of at least 1.25 of total monovalent and halogenated monovalent hydrocarbon radicals per silicon atom, (2) up to 50% by weight based on the weight of siloxane (1) of a hydroxylated compound selected from the group consisting of silanols, low molecular weight hydroxylated siloxanes, water, carboxylic acids and alcohols of less than twelve carbon atoms, (3) stannous salt of a carboxylic acid in amount sufficient to give from .1 to 10% by weight tin based on the weight of siloxane (1) and (4) at least 5% by weight of (1), (2) and (3) of a compound selected from the group consisting of nickelous bromide, aromatic pentabromo ethyl benzene and aromatic pentabromo toluene, and thereafter allowing the mixture to foam.

2. The method in accordance with claim 1 wherein the organic radicals in siloxane (1) are methyl radicals and wherein the catalyst (3) is the stannous salt of an aliphatic carboxylic acid.

3. The method in accordance with claim 1 wherein the organic radicals in siloxane (1) are both methyl and phenyl radicals and wherein the catalyst (3) is a stannous salt of an aliphatic carboxylic acid.

4. A fire resistant elastomeric siloxane rubber foam comprising the reaction product of (1) an organopolysiloxane containing silicon-bonded OH groups and having a viscosity of at least 50 cs. at 25° C. and having per silicon atom an average of from 1.9 to 2 radicals selected from the group consisting of monovalent hydrocarbon radicals, halogenated monovalent hydrocarbon radicals and hydrogen atoms, in said siloxane there being from 1 to 75% by weight siloxane units containing at least one silicon-bonded hydrogen atom and in said siloxane there being on the average at least 1.25 of total monovalent and halogenated monovalent hydrocarbon radicals per silicon atom, (2) up to 50% by weight based on the weight of siloxane of a hydroxylated compound selected from the group consisting of silanols, low molecular weight hydroxylated siloxanes, water, carboxylic acids and alcohols of less than twelve carbon atoms, (3) a stannous salt of a carboxylic acid in amount sufficient that there is from .1 to 10% by weight tin based on the weight of siloxane (1), and (4) at least 5% by weight of (1), (2) and (3) of a compound selected from the group consisting of nickelous bromide, aromatic pentabromo ethyl benzene and aromatic pentabromo toluene.

5. A method of preparing a fire resistant siloxane elastomeric foam which comprises mixing (1) a mixture of (a) an organopolysiloxane containing silicon-bonded OH groups and having a viscosity of at least 50 cs. at 25° C. and having an average of from 1.9 to 2 organic radicals of the group consisting of monovalent hydrocarbon radicals and halogenated monovalent hydrocarbon radicals per silicon atom and (b) a siloxane containing silicon-bonded hydrogen in amount such that there is from 1 to 75% by weight based on the weight of (a) of siloxane units containing at least one silicon-bonded hydrogen atom, the remaining groups attached to the silicon in (b) being organic radicals selected from the group consisting of monovalent hydrocarbon radicals and halogenated monovalent hydrocarbon radicals, (2) from 1 to 50% by weight based on the weight of (1) of a hydroxylated compound selected from the group consisting of silanols, low molecular weight hydroxylated siloxanes, water, carboxylic acids and alcohols of less than twelve carbon atoms, (3) a stannous salt of a carboxylic acid in amount sufficient to give from .1 to 10% by weight tin based on the weight of siloxane (1) and (4) at least 5% by weight of (1), (2) and (3) of a compound selected from the group consisting of nickelous bromide, aromatic pentabromo ethyl benzene and aromatic pentabromo toluene, and thereafter allowing the mixture to foam.

6. The method in accordance with claim 5 in which all of the organic radicals in siloxane mixture (1) are methyl radicals and wherein the catalyst (3) is a stannous salt of an aliphatic carboxylic acid.

7. The method in accordance with claim 5 wherein all of the organic radicals in siloxane mixture (1) are methyl and phenyl radicals and wherein the catalyst (3) is a stannous salt of an aliphatic carboxylic acid.

8. A fire resistant elastomeric siloxane rubber foam comprising the reaction product of (1) a mixture of (a) an organopolysiloxane containing silicon-bonded OH groups and having a viscosity of at least 50 cst. at 25° C. and having an average of from 1.9 to 2 organic radicals of the group consisting of monovalent hydrocarbon radicals and halogenated monovalent hydrocarbon radicals per silicon atom and (b) a siloxane containing silicon-bonded hydrogen atoms in amount such that there is from 1 to 75% by weight siloxane units containing at least one silicon-bonded hydrogen atom based on the weight of (a), the remaining groups attached to the silicon in (b) being organic radicals selected from the group consisting of monovalent hydrocarbon radicals and halogenated monovalent hydrocarbon radicals, (2) from 1 to 50% by weight based on the weight of (1) of a hydroxylated compound selected from the group consisting of silanols, low molecular weight hydroxylated siloxanes, water, carboxylic acids and alcohols of less than twelve carbon atoms, (3) a stannous salt of a carboxylic acid in amount sufficient to give from .1 to 10% by weight tin based on (1), and (4) at least 5% by weight of (1), (2) and (3) of a compound selected from the group consisting of nickelous bromide, aromatic pentabromo ethyl benzene and aromatic pentabromo toluene and thereafter allowing the mixture to foam.

References Cited in the file of this patent

UNITED STATES PATENTS 2,676,927    McCurdy et al.    Apr. 27, 1954

FOREIGN PATENTS 784,826    Great Britain    Oct. 16, 1957